United States Patent [19]
Hanemaayer

[11] Patent Number: 5,192,111
[45] Date of Patent: Mar. 9, 1993

[54] BUILT-IN AWNING FOR RECREATIONAL VEHICLE

[75] Inventor: Jacobus N. Hanemaayer, Kitchener, Canada

[73] Assignee: Hanmar Motor Corporation, Kitchener, Canada

[21] Appl. No.: 845,380

[22] Filed: Mar. 3, 1992

[30] Foreign Application Priority Data

Oct. 30, 1991 [CA] Canada .................................. 2054531

[51] Int. Cl.$^5$ ............................................... B60P 3/34
[52] U.S. Cl. ...................................... 296/163; 135/88
[58] Field of Search .................. 296/163, 162; 135/88, 135/89

[56] References Cited

U.S. PATENT DOCUMENTS

| 3,720,438 | 3/1973 | Johnson et al. ...................... 296/163 |
| 4,164,972 | 8/1979 | Bennett .............................. 135/89 X |
| 4,862,940 | 9/1989 | Atchison ........................... 296/163 X |
| 4,941,524 | 7/1990 | Greer ............................... 296/163 X |

FOREIGN PATENT DOCUMENTS 7907204  3/1981  Netherlands ......................... 296/163

OTHER PUBLICATIONS

Fiamma Catalogue printed Sep. 1991—cover page & pp. 13-18.

Primary Examiner—Charles A. Marmor
Assistant Examiner—Joseph D. Pape
Attorney, Agent, or Firm—Killworth Gottman Hagan & Schaeff

[57] ABSTRACT

A recreational vehicle or trailer, the vehicle body including opposed sidewalls, wherein one of the sidewalls includes, in an upper region thereof, an elongated recess having an elongated mouth which opens to the exterior of the body. This recess extends in the fore and aft body direction and an elongated reel extends longitudinally within this recess and is mounted for rotation therein about its longitudinal axis. The reel is adapted to carry a length of awning material thereon. A rotating mechanism is provided for rotating said reel to effect wrapping or unwrapping of the awning material thereon to permit the awning material to be retracted into the recess or to be extended outwardly of the recess beyond the sidewall of the body. A door is also provided for closing the mouth of the recess when the awning material has been fully retracted into the recess.

19 Claims, 5 Drawing Sheets

BUILT-IN AWNING FOR RECREATIONAL VEHICLE

BACKGROUND OF THE INVENTION

This invention relates generally to recreational vehicles and the like and in particular to a built-in awning arrangement for use in conjunction with such vehicles.

Awning systems for use on recreational vehicles are generally well known in the art. A wide variety of manually operated and motor operated awning systems are manufactured, for example, by Fiamma S.p.A. of Italy, one recent series of designs being known as the "Fiamma F45" deluxe awning. This awning, and, so far as is known, all other commercially available recreational vehicle awnings, are installed externally of the exterior walls of the recreational vehicle (commonly known as an "RV"). The awning system including the elongated reel for the awning material and the drive means therefor are typically housed in an elongated housing, which housing is mounted externally by means of brackets designed for the purpose on the exterior wall of the vehicle. This external arrangement tends to detract from the overall appearance of the RV. Furthermore, awning systems of this type cannot be easily installed on a horizontally curved wall. Due to their rollers or reels, they are suitable for installation on straight or flat surfaces. However, the trend in the RV industry, as in the automotive industry, is to exterior walls having not only horizontal curvature but vertical (compound) curvature. The existing externally mounted awning systems are unsuitable for installation on these curved aerodynamic surfaces.

SUMMARY OF THE INVENTION

The principal object of the present invention is to provide a "built-in" awning system for a recreational vehicle or the like, which built-in awning provides a very neat and pleasant appearance with little or no wind resistance and no wind noise when closed. A further object is to provide such a system which is usable with virtually any exterior shape whether the exterior surfaces be flat or smoothly convexly contoured, as is the case with many modern RV's.

Accordingly the invention in one aspect provides a recreational vehicle (which includes both powered vehicles and trailers), the vehicle body including opposed sidewalls, wherein one of sidewalls includes, in an upper region thereof, an elongated recess having an elongated mouth which opens to the exterior of said body. This recess extends in the fore and aft body direction and an elongated reel extends longitudinally within this recess and is mounted for rotation therein about its longitudinal axis. The reel carries a length of awning material thereon. Means are provided for rotating said reel to effect wrapping or unwrapping of the awning material thereon to permit the awning material to be retracted into the recess or to be extended outwardly of the recess beyond the sidewall of the body. A door is also provided for closing the mouth of the recess when the awning material has been fully retracted into the recess.

As a further aspect of the invention, said door is secured via suitable attachment means to an end of the awning material and is movable from a position within the mouth of said recess to a position remote from the body sidewall with the awning material extending therebetween.

Typically, in the extended position of the awning, adjustable poles are utilized for support thereby to provide the desired awning slope or, alternatively, adjustable braces mountable to the body sidewall may be used to achieve the same purpose.

As a further feature of the invention, the attachment means includes a bracket having an adjustable connection to said door to enable good fit of the door within the mouth of the recess.

Further according to a feature of the invention, said door is hinged to said body for movement about a fore and aft axis between an open position permitting the attachment means and the awning material to be withdrawn, and a closed position blocking the mouth of the recess.

According to a further feature of the invention, the body sidewall has compound curvature in the region of the door, the door surface being generally flush with the body sidewall in the closed position, and said mouth of the recess having a curved upper margin to accommodate the curvature of the door surface and avoid binding when the door is pivoted to the open position.

Still further according to the invention, said recess is defined by an elongated open sided housing extending within the body in close juxtaposition to said one sidewall thereof.

In a typical embodiment of the invention resilient seal means are interposed between the door and the recess to prevent ingress of water and dust.

According to a further feature of the invention, said drive means are located within said housing and include gear means operably connected to said reel to effect the rotation thereof.

As a still further feature of the invention there is provided manually rotatable means extending through a wall of said housing and accessible from the interior of the vehicle body for rotating the reel.

A preferred form of the invention also incorporates an electric motor means connected to the above-noted gear means for rotating the reel. In the preferred form of the invention the gears are alternatively selectable to drive the reel to be drive either manually or via the motor.

The above-noted drive mechanism may include a shift lever extending through a wall of the housing and accessible from the interior of the vehicle body for selecting the gears. Alternatively, removable screws projecting interiorly of the housing may be used to retain the gears in a desired driving relation. Certain of these screws may be removable to allow a tool to be inserted to move the gears into a different position such as to disengage the gears in the event of a power failure and to permit manual operation of the reel.

In a typical arrangement, the reel and its drive means are mounted to a common support frame. The support is firmly secured within the above-noted open-sided housing by suitable brackets and shims are typically interposed between the brackets and the housing to facilitate the making of adjustments between them and to provide for still better entry of the door as the awning is reeled in.

Additional features and advantages of the invention will be more readily apparent from a review of the following description of preferred embodiments of the invention and the appended claims.

DESCRIPTION OF THE VIEWS OF DRAWINGS

DETAILED DESCRIPTION OF PREFERRED EMBODIMENTS

Figure 1:
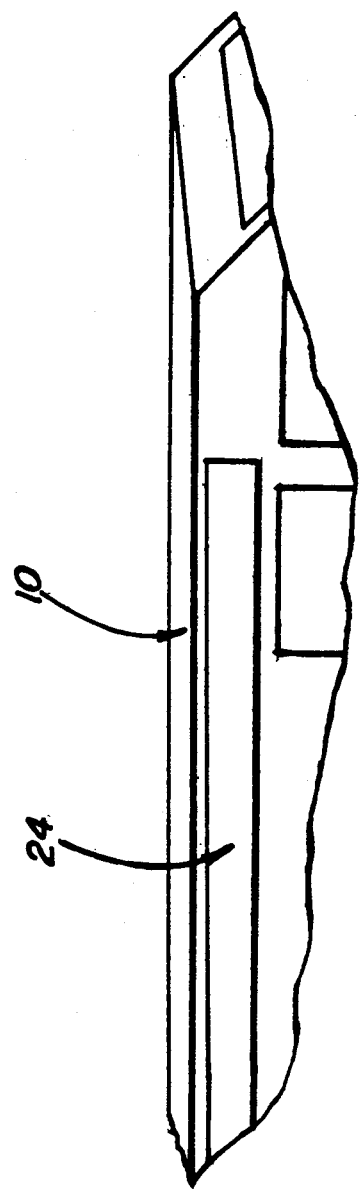
FIG. 1 is a fragmentary view of an upper portion of an RV body showing the awning door in the closed position.
Figure 2:
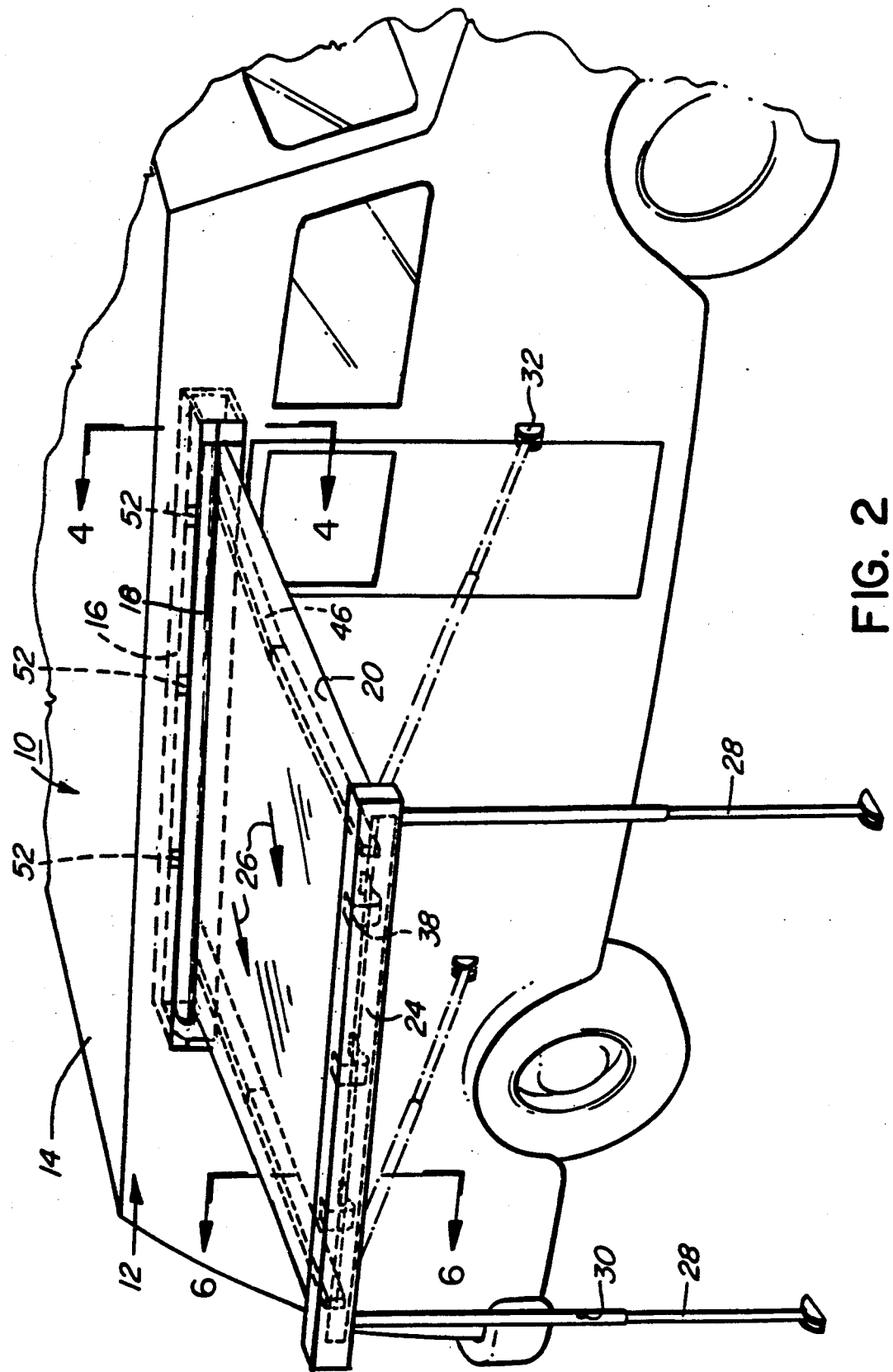
FIG. 2 is a perspective view of an RV with the awning in the extended, in-use, position, it being noted that in FIGS. 1 and 2 the RV vehicle has generally flat side walls.

Referring now to FIGS. 1 and 2 there is shown one variety of RV 10 of any well known conventional design, the body including generally flat opposed side walls 12. One of these sidewalls 12 includes, in an upper region of same just below the roof 14, an elongated recess which is defined by an open-sided elongated box-like housing 16 which extends lengthwise within the vehicle body in close juxtaposition to the exterior sidewall 12. An elongated reel 18 extends longitudinally within the recess defined by housing 16 and is journalled adjacent its ends by suitable bearings of a conventional nature (not shown). The reel 18 carries a length of a suitable awning material 20 of any suitable commercially available variety. A reel rotating mechanism 22 is also provided adjacent the frontal end of housing 16 for rotating reel 18 to effect wrapping or unwrapping of the awning material 20 thereon thus permitting the awning material to be retracted into the recess or alternatively to be extended outwardly of the recess beyond the sidewall 12 of the body to the extended position shown in FIG. 2. Additionally, there is provided a door 24 for closing the mouth of the recess defined by housing 16 when the awning material has been fully wound up on the reel and hence retracted into the recess.

Figure 4:
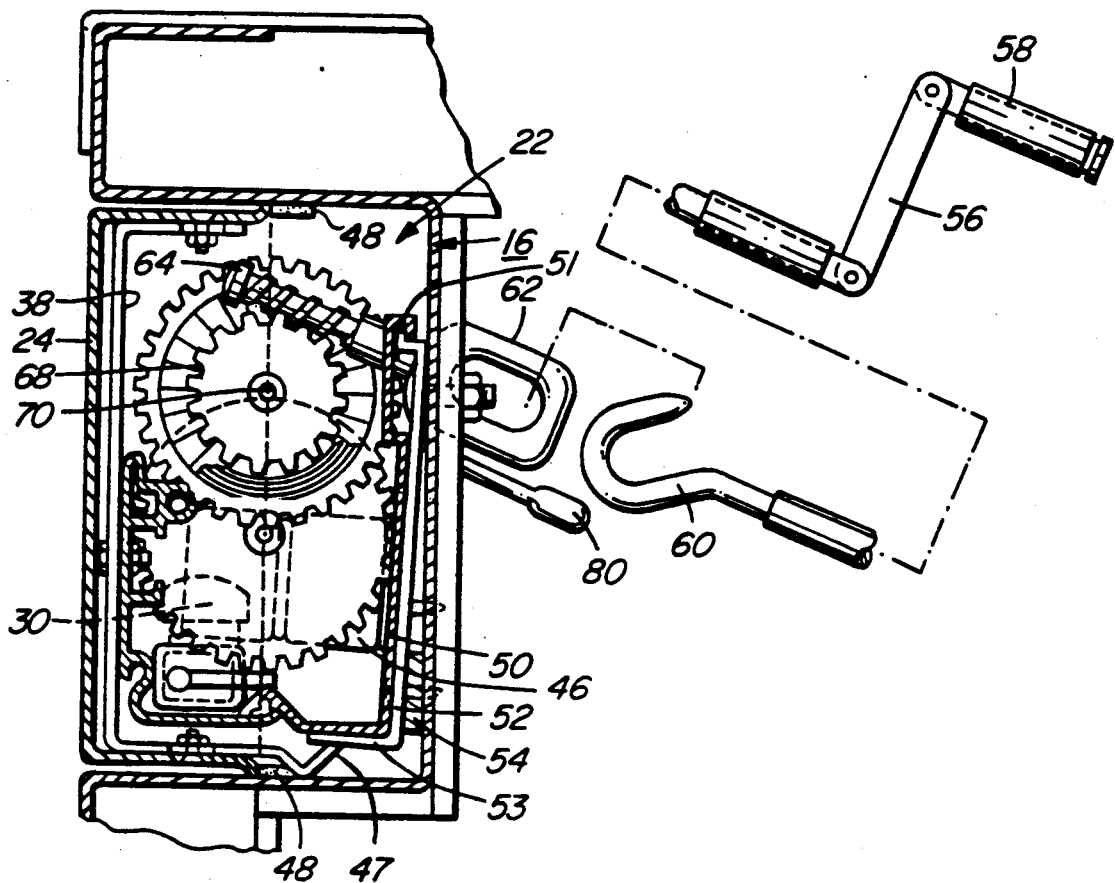
FIG. 4 is a cross-section view taken through the built-in awning at the location of the drive means therefor, reference being had to line 4—4 in FIG. 2.

With further reference to FIG. 1, the door 24 is shown as covering or closing the mouth of the elongated housing 16. The door 24 is flush with the flat exterior wall 12 of the RV 10. The door 24 can be hinged along its upper edge for pivotal movement between the open and closed positions (similar to the embodiment of FIG. 8 but flat and not curved) or it can be the extendible type as shown in FIGS. 2, 4 and 6.

With reference now to FIG. 2, the flexible awning 20 is shown in the extended position with the door 24 attached to the outer extremity of same by brackets to be hereinafter described. The arrows 26 on the awning material 20 show the preferred direction of rainwater flow achieved by making suitable adjustments to the telescopically adjustable supports 28 which rest on the ground and are held at the chosen heights by turn knobs 30. Alternatively, supports 28 may be releasably fastened to the RV exterior wall 12 at support points 32 and similarly adjusted to provide the desired height. Since the adjustable supports 28 are well known as such in the art, a further description of same is considered unnecessary.

Figure 6:
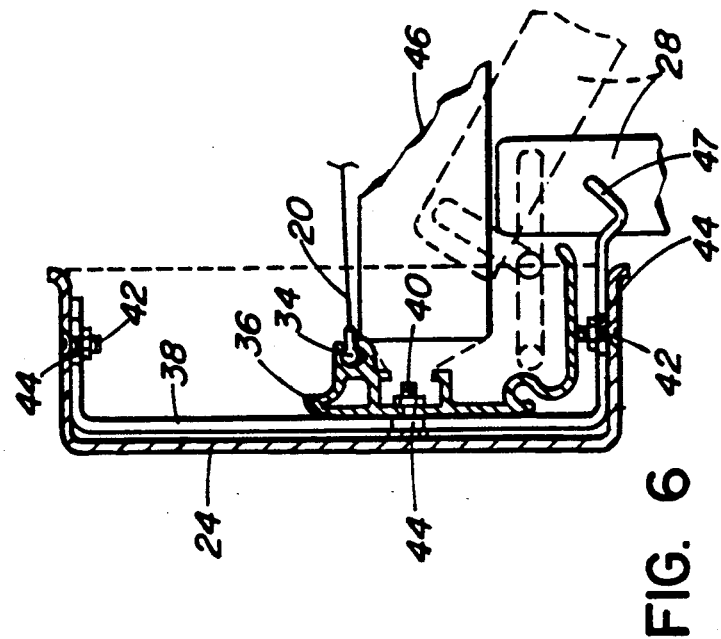
FIG. 6 is a cross-section view taken through the extended door illustrated in FIG. 2 along line 6—6 thereof.

Turning now to FIG. 6, it will be seen that the outer or distal end of the awning fabric 20 is provided with a marginal bead 34 which is trapped in a correspondingly shaped groove provided in a metallic extrusion 36 which extends the full width of the awning. Three spaced apart generally U-shaped brackets 38 are secured to the extrusion 36 by adjustment bolts 40. The door 24, the cross-sectional shape of which complements the shape of brackets 38, closely embraces these brackets. Adjustment bolts 42 extend through and connect the upper and lower legs of the door 24 to the brackets 38. The adjustment bolts 42 extend through slotted openings 44 in the brackets thus allowing limited movement inwardly and outwardly of door 24 relative to each bracket. This adjustment and the adjustment of bolts 40 securing extrusion 36 to bracket 38 are very useful in the course of assembly procedures as they allow for manufacturing tolerances and permit the door exterior surface to be adjusted so that it is flush with the RV sidewall 12 and properly spaced for height in the mouth of the box-like housing 16.

With further reference to FIG. 6, the previously noted bolts 40 for securing extrusion 36 to brackets 38 pass through slotted openings 44 in the brackets thereby to allow for vertical height adjustments relative to the metallic extrusion 36 that the awning material is attached to provide suitable fit and height alignment with the mouth of the housing 16. It is also noted that the lower inward pointing guide ends 47 of the brackets 38 are bent upwardly to allow smooth and precise entering of door 24 into the mouth of the recess defined by housing 16 when closing. These guide ends 47 are preferably plastic covered for smooth damage-free operation when opening and closing door 24. It will also be noted from FIG. 4 that the upper and lower marginal edges of the door are outwardly turned and make contact with resilient sealing strips 48 bonded to the upper, lower and end interior walls of housing 16 thereby to prevent rainwater and dust from entering the recess when the door 24 is closed.

The upper ends of the adjustable supports 28 are also shown in FIG. 6, and it will be noted that they are pivotally secured to the above-noted extrusion 36. These supports can be swung upwardly and around into alignment with the elongated extrusion and effectively positioned inside of the door structure as illustrated in FIG. 4. Since this feature is, per se, well known in the art, it need not be described further. Similarly, the hinged and foldable support arms 46 have their outer ends illustrated in FIG. 6, (these folding support arms 46 being illustrated in phantom in FIG. 2.) These arms provide additional support for the awning fabric when in the extended position illustrated in FIG. 2. When the awning fabric is retracted into the housing 16, the arms 46 fold inwardly upon one another and occupy the positions illustrated in FIGS. 4, 7 and 8. Since this feature is also known per se in the art, a further description at this point is believed unnecessary.

Figure 7:
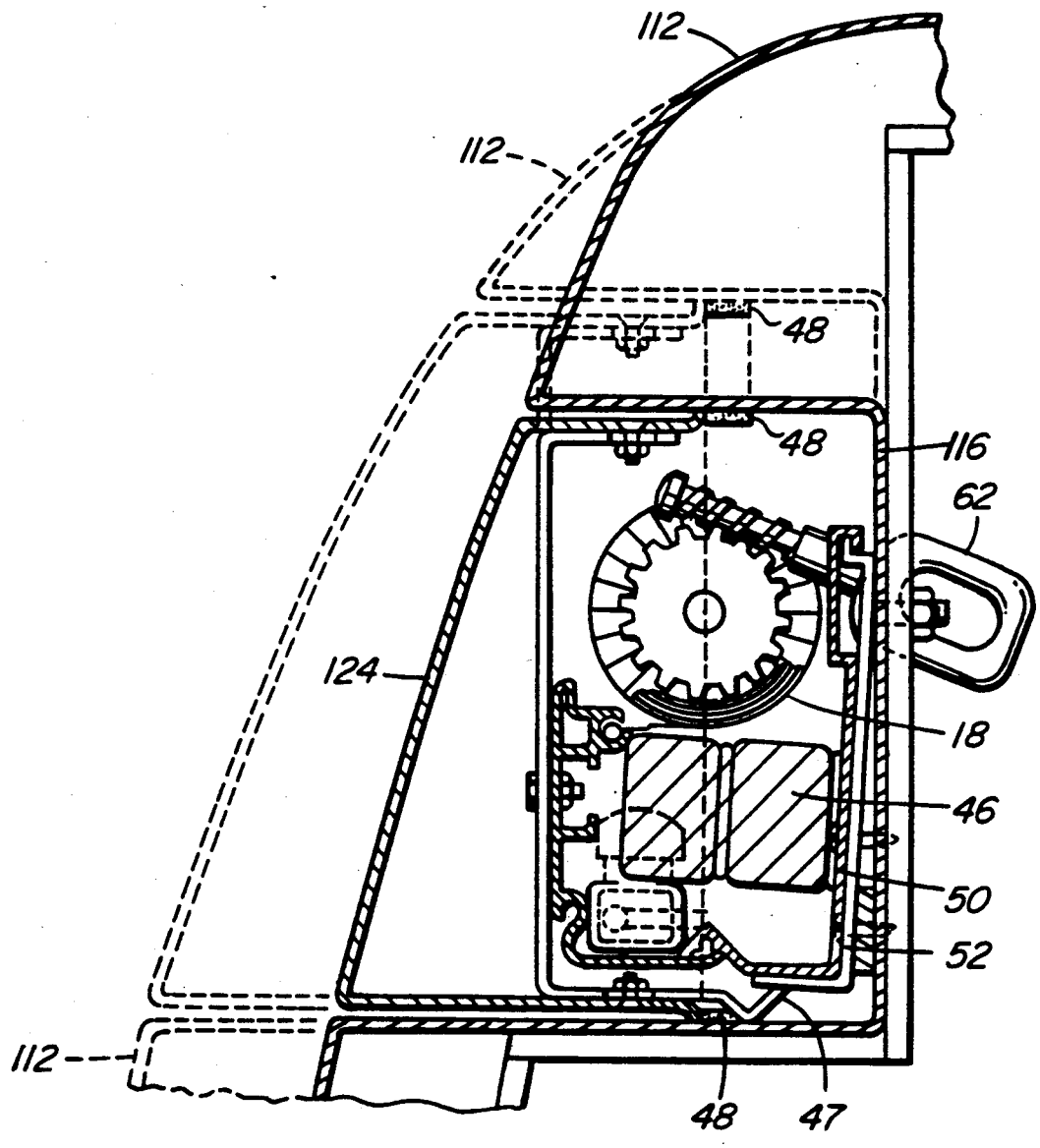
FIG. 7 is a cross-section view similar to that of FIG. 4 with the door in the closed position but wherein the vehicle body has a smooth aerodynamic exterior shape with compound curves.
Figure 8:
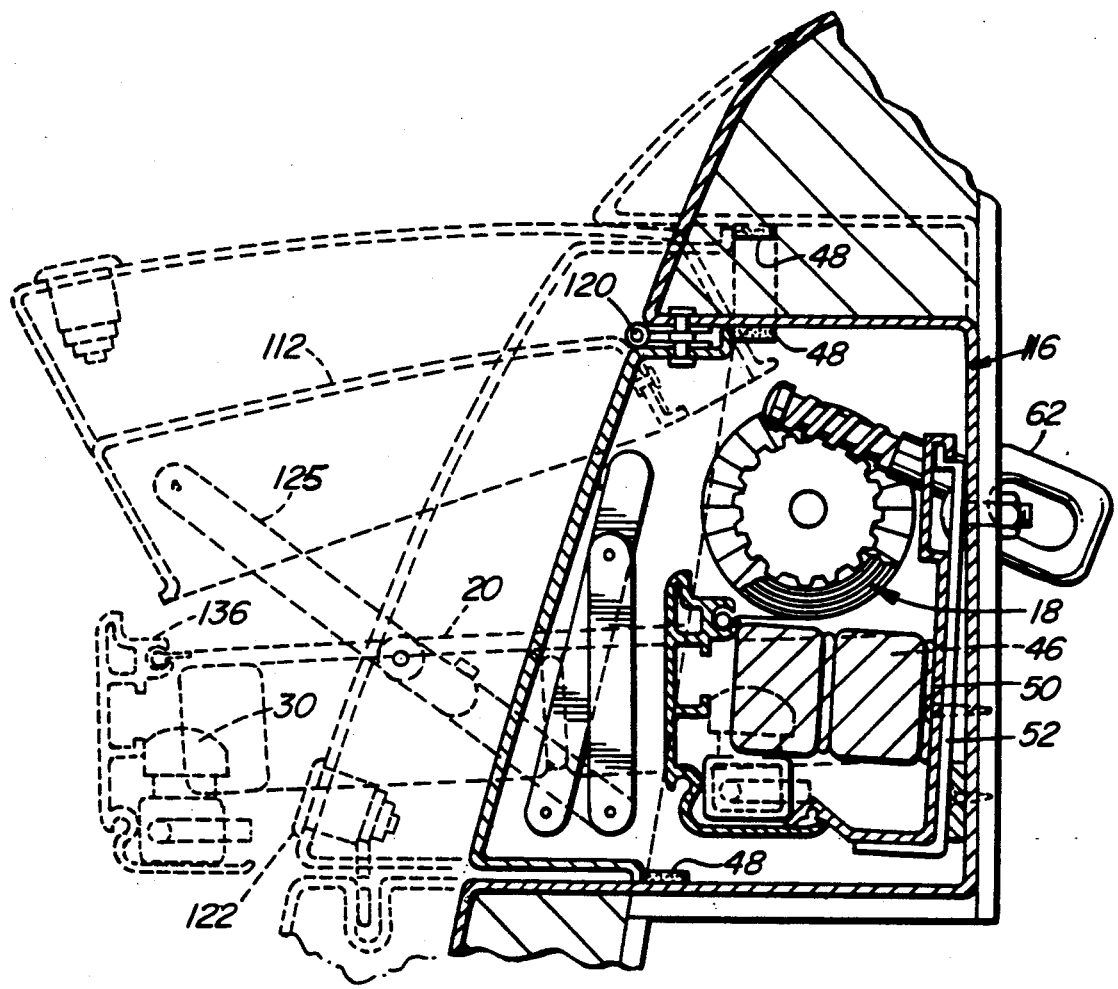
FIG. 8 is a cross-sectional view somewhat similar to that of FIG. 7 but wherein a modified form of pivoting or hinged door arrangement is utilized.

The awning mechanism is further illustrated in FIGS. 4, 7 and 8. The complete awning may of course be purchased from a manufacturer, such as the one noted previously, ready for installation. Alternatively, it may be custom designed to fit into the recess defined by housing 16. In the embodiment illustrated in the drawings, in FIG. 4, 7 and 8, the awning mechanism includes a common support frame 50. This support frame 50 extends the full length of the awning and the previously noted reel 18 is mounted thereon via suitable bearings as also is the drive mechanism in its various forms to be described hereafter. This support frame 50 is securely attached within housing 16 by several brackets 52, three of which are shown and are bolted through the back of the housing 16. Brackets 52 secure the support frame 50 in place by hooking the latter over the inwardly stepped upper edge 51 of the brackets 52 with frame 50 resting on this upper edge 51 and on the outwardly turned lower bracket flange 53. If necessary, shims 54 may be interposed between the brackets 52 and the interior wall of the recess defined by housing 16 to adjust the position of the support frame and further assist and ensure proper alignment and smooth operation of the awning when being extended and retracted as well as smooth entry and exit of the door 24 and the guide ends 47 of U-shaped brackets 38.

The shims 54 are not attached to the support frame 50 or holding brackets 52 but only to the housing 16. Thickness of the shims will be as required. This would depend on the required angle of the awning to better align the upward and inward pointing guide ends 47 of the adjustable brackets 38 the door 24 is bolted to.

The manual drive mechanism illustrated in FIG. 4 includes a handcrank 56 with a handle 58 at one end and a hook 60 at the other end. The hook 60 engages with a rotatable eyelet 62 for effecting opening and closing of the awning system The eyelet 62 is fixed to a drive shaft 64 forming part of a worm gear 66. The teeth of worm gear 66 engage with the teeth of gear 68 which is fixed to the shaft 70 of the reel 18 to effect winding up of the awning fabric 20 when the eyelet 62 is manually rotated by the crank assembly described above Referring now to FIG. 5, there is shown a longitudinal section of the drive gearing enabling shifting from manual to power drive and vice versa. A reversible electric motor 71 of any well known design suited for this purpose is mounted to the aforementioned common support frame 50 and its output shaft is provided with gear teeth 72 which engage the teeth of gear 74. The shaft of gear 74 is provided with teeth 76 which are capable of engaging the teeth of axially movable shifting gear 78. Shifting gear 78 is mounted for axial movement on the shaft 70 of reel 18. Suitable splines (not shown) prevent relative rotation between shifting gear 78 and reel shaft 70. It will readily be seen that when the shifting gear 78 is in the dashed line position of FIG. 5, that the reel 18 is driven via the gear train described above from the electric motor. When the gear 78 is moved to the full line position, it is disengaged from the gear teeth on shaft 76 and the reel 18 can then be manually rotated by means of the crank and gear mechanism described above.

Those skilled in the art will realize that all gears will be sized to provide the appropriate speed reduction between the output of the electric motor and the shaft for the reel 18. For smoother starting, a clutch could be incorporated although this should not be necessary.

Figure 5:
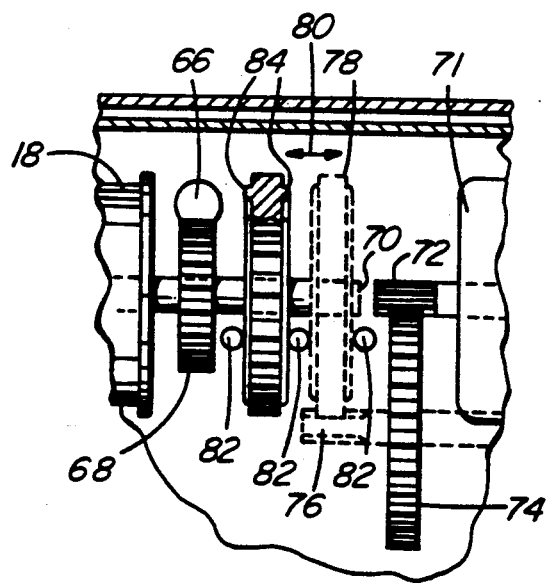
FIG. 5 is a fragmentary longitudinal section view illustrating the gear change mechanism for a motorized awning drive.

In order to effect the shifting of the gear 78 between the positions illustrated in FIG. 5, a shift lever 80 can be employed having forks 82 which engage opposing sides of gear 78. In order to reduce excessive wear and friction, shifting gear 78 may be provided on its opposing sides with raised annular ribs 84 which run against the forks during extension and retraction of the awning.

An alternative arrangement for shifting between a manual and motorized drive will now be described. In this alternative, the shift lever 80 and forks 82 are deleted altogether. In their place, three set screws are installed at the three positions previously shown for the forks 82. These set screws may be mounted in the previously described support frame 50 and the set screws are of course sufficiently long, i.e. they extend interiorly of the housing 16 sufficiently as to engage the opposing sides of shifting gear 78. When utilizing this system and one wishes to move the shifting gear 78 axially from one position to another, all one has to do is to remove the center set screw and one of the other set screws so as to allow insertion of a L-shaped lever, such as an Allen wrench, thereafter rotating such tool thereby to slide the shifting gear to its new axial position following which the set screws are reinserted. This procedure can be carried out in a matter of minutes and it would only have to be done in the event of malfunctioning of the electric motor due to loss of power or mechanical failure. In order to align the gear teeth in the course of shifting, all one has to do is to turn the eyelet 62 very slightly by hand and this can be done very easily without employing the crank 56.

Figure 3:
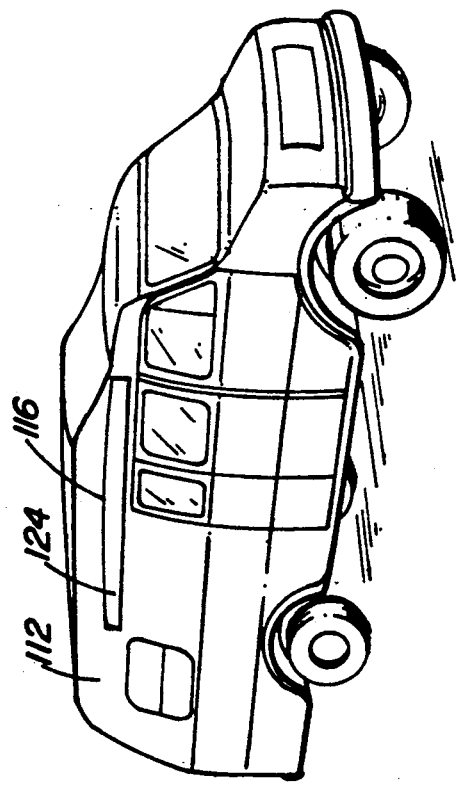
FIG. 3 is a perspective view of another type of RV possessing aerodynamically contoured exterior walls and with the awning door in the closed position.

Before describing the modified embodiments of FIGS. 7 and 8, brief reference will be had to FIG. 3 which illustrates a typical modern aerodynamically shaped RV body. This exterior of this RV has compound curved exterior sidewalls 112. The door 124 is modified so as to be flush with the compound curved exterior surface 112. As will be seen from FIG. 3, the upper margin of door 124 and the upper margin of the mouth or entryway to the recess defined by housing 116 have a very slight upwardly convex contour. This allows door 124 to be hinged adjacent its opposing ends for pivotal movement relative to the vehicle body as illustrated in FIG. 8.

With reference to FIG. 7, this Figure shows the previously noted compound curved exterior wall 112 and the modified housing door 124 which is shaped and arranged so as to be flush with the adjacent exterior sidewall. The full lines illustrate typical shapes adjacent, for example, the one end of the door while the dashed lines illustrate typical shapes approximately half way along the length of the door. The increase in height toward the center point of the door is readily apparent from this Figure. It should be understood however that in the FIG. 7 embodiment, the change in door height toward the central portion is not actually necessary because this door version pulls straight out from the recess defined by the housing just as in the embodiment illustrated in FIGS. 2, 4 and 6. However, since a manufacturer may wish to use essentially the same design for pivoting or hinged doors as for straight pull-out doors, the arrangement shown in FIG. 7 may be highly desirable.

In the embodiment of FIG. 8, the modified door 112 is provided with a hinge 120 adjacent each of its opposing ends thereby to allow the door to be pivoted to the open dashed line position shown. Since there is relative translational motion of the upper edge of the door between its opposing ends and the adjacent sidewall surfaces, it is readily apparent that hinges are permitted only adjacent the opposing ends of the pivoting door and not in the middle of same.

The pivoting door 112 is provided adjacent its lower edge with a lock 122 for purposes of security and the door is held open by linkage members 125 when fully extended. The extrusion 136 attached to the distal outer edge of awning fabric 20 operates in exactly the same way as extrusion 36 described previously with reference to FIG. 6 but of course it is not in any way attached to the pivoting door. When the awning has been extended, the extrusion 136 is supported as described previously by the adjustable supports 28.

It will be readily apparent that the motorized version illustrated in FIGS. 4 and 5 applies equally well to the embodiments of FIGS. 7 and 8 although not specifically shown there.

It is furthermore noted that the pivoting door 112 in FIG. 8 allows for storage of long objects directly in front of the awning recess itself, especially in the central region of the door where the space is the deepest due to its outward curvature. The same space prevails in the door of FIG. 7 but is not as readily accessible as in the FIG. 8 arrangement which is due to its fixed position on the extendible front of the awning and must be loaded from the top when open. On the other hand the advantage of the door arrangement in FIG. 7 is that objects don't have to be removed when opening the awning which is the case with the door design as shown in FIG. 8. Some customers may choose not to have an awning at all and may use the entire space provided by housing 16 for storage. Hence, this is a further reason for providing the curved top edge of the opening in the arrangement of FIG. 7 so that a pivoting door as illustrated in FIG. 8 can be installed.

Preferred embodiments of the invention have been described by way of example. Those skilled in the art will realize that various modifications and changes may be made while remaining within the spirit and scope of the invention. Hence the invention is not to be limited to the embodiments as described but, rather, the invention encompasses the full range of equivalencies as defined by the appended claims.

I claim:

1. A recreational vehicle comprising a vehicle body including opposed sidewalls, and wherein one of said sidewalls includes, in an upper region thereof, an elongated recess having an elongated mouth which opens to the exterior of said body, said recess extending in the fore and aft direction of said body, an elongated reel extending longitudinally within said recess and mounted for rotation therein about the longitudinal axis of said reel, said reel carrying a length of awning material thereon, means for rotating said reel to effect wrapping or unwrapping of said awning material thereon or therefrom to permit said awning material to be retracted into said recess or to be extended outwardly of said recess beyond said one sidewall of the body, and a door for closing said mouth of said recess when said awning material has been fully retracted into said recess.

2. The recreational vehicle of claim 1 wherein said door is secured via an attachment means to an end of said awning material said door being movable from a position within said mouth of said recess to a position remote from said one body sidewall with said awning material extending between said door and said reel.

3. The recreational vehicle of claim 2, wherein said attachment means includes a bracket having an adjustable connection to said door to facilitate fitting of the door within said mouth of said recess.

4. The recreational vehicle of claim 1, wherein said door is hinged to said body for movement about a fore and aft axis between an open position permitting said awning material to be withdrawn and a closed position blocking said mouth of said recess.

5. The recreational vehicle of claim 4 wherein said body sidewall has compound curvature in the region of said door, the door having an exterior surface which is curved and generally flush with said body sidewall in the closed position, and said mouth of said recess having a curved upper margin to accommodate the curvature of the door exterior surface and to avoid binding when the door is pivoted to the open position.

6. The recreational vehicle of claim 2 wherein said body sidewall has compound curvature in the region of said door, said door having an exterior surface which is curved and generally flush with said body sidewall when in the closed position.

7. The recreational vehicle of claim 1 wherein both said body sidewall and said door are generally flat.

8. The recreational vehicle of claim 7 wherein said door is secured via an attachment means to an end of said awning material and said door being movable from a position within said mouth of said recess to a position remote from said one body sidewall with the awning material extending between said door and said reel.

9. The recreational vehicle of claim 8, wherein said attachment means includes a bracket having an adjustable connection to said door to enable fitting of said door within said mouth of said recess.

10. The recreational vehicle of claim 7 wherein said door is hinged to said body for movement about a fore and aft axis between an open position permitting said awning material to be withdrawn and a closed position blocking said mouth of said recess.

11. The recreational vehicle of claim 1 wherein said recess is defined by an elongated open sided housing extending within said body in close juxtaposition to said one sidewall thereof.

12. The recreational vehicle of claim 1 wherein said recess is defined by an elongated open sided housing extending within said body in close juxtaposition to said one sidewall thereof and resilient seal mans interposed between said door and said recess to prevent ingress of water and other foreign material.

13. The recreational vehicle of claim 1 wherein said recess is defined by an elongated open sided housing extending within said body in close juxtaposition to said one sidewall thereof, said means for rotating said reel being located within said housing and comprising gear means operably connected to said reel to effect the rotation thereof.

14. The recreational vehicle of claim 13 wherein said means for rotating said reel further includes manually rotatable means extending through a wall of said housing and accessible from the interior of said vehicle body for rotating said reel via said gear means.

15. The recreational vehicle of claim 14 wherein said means for rotating said reel further includes electric motor means connectable to said gear means for rotating said reel.

16. The recreational vehicle of claim 15 wherein said gear means includes gears alternatively selectable to drive said reel either manually or by said motor.

17. The recreational vehicle of claim 16 including a shift lever mechanism extending through said wall of said housing and accessible from the interior of said body for selecting said gears.

18. The recreational vehicle of claim 16 including removable screws projecting interiorly of said housing for retaining said gears in a desired driving relation, certain of said screws being removable to allow a tool to be inserted into said housing to move said gears to a different position.

19. The recreational vehicle of claim 13 wherein said reel and said drive means therefor are mounted to a common support, the latter being secured on brackets within said open-sided housing, and shims between said brackets and said housing to facilitate adjustments therebetween.

* * * * *